(12) United States Patent
Rambo et al.

(10) Patent No.: US 10,652,276 B1
(45) Date of Patent: May 12, 2020

(54) SYSTEM AND METHOD FOR DISTINGUISHING AUTHENTIC AND MALICIOUS ELECTRONIC MESSAGES

(71) Applicant: INTUIT INC., Mountain View, CA (US)

(72) Inventors: Brent Rambo, San Diego, CA (US); Kyle McEachern, San Diego, CA (US); Antonio Fuentes, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 318 days.

(21) Appl. No.: 15/636,537

(22) Filed: Jun. 28, 2017

(51) Int. Cl.
  *H04L 29/06* (2006.01)
  *H04L 12/58* (2006.01)
  *G06Q 40/00* (2012.01)

(52) U.S. Cl.
  CPC ......... *H04L 63/1483* (2013.01); *H04L 51/08* (2013.01); *H04L 63/1433* (2013.01); *G06Q 40/123* (2013.12)

(58) Field of Classification Search
  CPC .. H04L 63/1483; H04L 51/08; H04L 63/1433
  See application file for complete search history.

(56) References Cited

U.S. PATENT DOCUMENTS

| | | | | |
|---|---|---|---|---|
| 5,970,143 A | * | 10/1999 | Schneier | A63F 13/71 380/251 |
| 7,630,381 B1 | * | 12/2009 | Roskind | G06F 8/65 370/395.42 |
| 8,752,172 B1 | * | 6/2014 | Dotan | H04L 63/1483 709/206 |
| 9,740,858 B1 | * | 8/2017 | Wu | G06F 21/566 |
| 9,781,149 B1 | * | 10/2017 | Himler | H04L 63/123 |
| 9,912,687 B1 | * | 3/2018 | Wescoe | H04L 63/1433 |
| 10,050,998 B1 | * | 8/2018 | Singh | H04L 63/1433 |

(Continued)

OTHER PUBLICATIONS https://en.wikipedia.org/wiki/Random_number_generation, printed: Jun. 26, 2017 (9pages).

(Continued)

*Primary Examiner* — Ali S Abyaneh
*Assistant Examiner* — Shu Chun Gao
(74) *Attorney, Agent, or Firm* — DLA Piper LLP (US)

(57) ABSTRACT

Anti-phishing computing systems and methods. A first computer that hosts an online software application with which an end user or customer has an account generates an electronic message and independent confirmation data and transmits electronic message data and the confirmation data to a second computer, which updates an activity log for the end user's account such that the confirmation data is associated with the electronic message data in the activity log. The confirmation data may be a randomly generated number and incorporate an identifier of the online software application. The electronic message including the confirmation data is transmitted to the end user computing device such that using the activity log and multiple confirmation data transmissions to different computing systems can be used to confirm that a source of the electronic message was the online software application and that the electronic message is not a fraudulent phishing electronic message.

23 Claims, 12 Drawing Sheets

(56) References Cited

U.S. PATENT DOCUMENTS

| | | | | |
|---|---|---|---|---|
| 2005/0210106 A1* | 9/2005 | Cunningham | ....... | G06Q 10/107 709/206 |
| 2006/0090073 A1* | 4/2006 | Steinberg | ................ | G06F 21/31 713/170 |
| 2013/0305367 A1* | 11/2013 | Yoshioka | ................ | H04L 51/12 726/23 |
| 2013/0333030 A1* | 12/2013 | Farris | .................... | H04L 63/123 726/22 |
| 2015/0127539 A1* | 5/2015 | Ye | ........................ | G06Q 20/401 705/44 |

OTHER PUBLICATIONS https://www.microsoft.com/en-us/safety/online-privacy/phishing-symptoms.aspx, printed: Jun. 26, 2017 (4pages).
https://turbotax.intuit.com/best-tax-software/secure-online-tax-prep/, printed: Jun. 26, 2017 (5pages).
https://security.intuit.com/index.php/protect-your-information/phishing-pharming-vishing-and-smishing. printed: Jun. 26, 2017 (4pages).
https://www.yahoo.com/finance/news/need-know-petya-ransomware-avoid-211930511.html, printed: Jun. 28, 2017 (5pages).

\* cited by examiner

173

Friendly, previous year, same email
TO: previous/current email
SUBJECT: Your TurboTax Account
FROM: TurboTax

<EMAIL CONTENT>

Check before you click!
*TurboTax will never ask you for personal information in an email.*
*When you click on a link, the address should always contain "intuit.com/".*
*Visit the "security.intuit.com/phishing" FAQ site to learn more. (Ref: 111133228)*

*Don't reply to this email. It was automatically generated.*

SYSTEM AND METHOD FOR DISTINGUISHING AUTHENTIC AND MALICIOUS ELECTRONIC MESSAGES

FIELD OF THE TECHNOLOGY

The present invention relates to technical fields of electronic messages, networked computing systems and online security, and more particularly, to anti-phishing computing systems and methods.

BACKGROUND

Embodiments address technical shortcomings of known on-line electronic messaging systems and anti-phishing systems.

Many users of the Internet and online software applications have fallen victim to malicious phishing emails or other electronic messages resulting in theft of their personal, sensitive and security information and financial losses. Phishing generally refers to malicious attempts to steal a consumer's data by, for example, imitating an electronic communication such that the electronic communication appears to be authentic and from a trustworthy source when the electronic communication is actually from a thief, thus using the purportedly authentic electronic message as "bait" to "fish" for the user's personal, sensitive or financial information. For example, a malicious electronic message may copy the look and feel of a known website or electronic mail message, using similar logos, structure and content. An unsuspecting consumer, believing that the electronic communication is authentic and from the expected trustworthy source (such as a financial institution or other known host), may proceed with responding to the electronic message by providing sensitive or personal information such as account numbers, social security numbers, credit card numbers and the like, and in doing so, unknowingly providing this information to a thief that is the source of the phishing message.

Phishing techniques may involve email spoofing, messaging (e.g. text or SMS messaging), and imitation of websites. Information acquired by malicious phishing emails may be used by thieves for various purposes including making withdrawals from a user's account, unauthorized credit card transactions or applying for credit cards, making and circulating fraudulent identifications, and taking over on-line accounts such as on-line social media accounts. Phishing websites may also include malware or viruses, which may be executed upon opening a malicious message, and which may disable the consumer's computer, which may be enabled again for payment of an "extortion" fee to the thief. The significance of these issues and the lack of technical solutions to same are evident by estimates that malicious phishing messages may cost consumers as much as 5 billion dollars annually.

Malicious electronic message and phishing that exploit various electronic messaging or web security weaknesses are even more difficult to combat since consumers may not even know how to determine whether an electronic message is authentic or malicious, and if the consumer attempts to call someone regarding a potential malicious electronic message, the consumer may still be unable to confirm that the customer service agent works for the known host and that the person on the other end of the line is not part of the malicious phishing scam.

SUMMARY

Embodiments address shortcomings and limitations of known electronic messaging, online security and anti-phishing systems. Embodiments improve upon these shortcomings and limitations by generation of source confirmation data that is transmitted in multiple directions or through multiple networks to different destinations or computing devices such that the source confirmation data is included in an electronic message sent to a user and recorded in an activity log for a consumer's account and associated with data of the electronic message. The confirmation data and multi-directional transmission of same can be used to determine that an electronic message is legitimate when the confirmation data in an electronic message matches confirmation data that was previously recorded in an activity log. Otherwise, systems may be configured to identify an electronic message as potentially malicious if no confirmation data is included in the electronic message or when the confirmation data that is included in the electronic message does not match any previously recorded data in an activity log.

Thus, embodiments provide solutions to malicious networked communications including solutions to on-line phishing or attempts to acquire user information through deceptive or fraudulent electronic communications. For example, a thief may transmit deceptive or fraudulent emails or text messages that purport to be authentic and from a valid source (e.g., a financial institution or software application involving personal information). However, the emails or text messages are from the thief who is attempting to imitate the valid source and extract the user's sensitive or private information (such as bank account numbers, social security numbers, personal information, etc.) for malicious and illegal purposes such as withdrawing funds from a user's account, stealing credit card information or generating fake identifications. Embodiments not only provide for computer-based solutions to phishing problems arising from within networked computing systems and electronic communications, but also provide for more efficient detection of potentially malicious electronic messages and confirmation whether an electronic communication is authentic and from a valid source or whether the electronic communication from a thief attempting to imitate the valid source. These enhancements also provide for improvements to computing systems by not only providing for more efficient and enhanced data security and electronic message analysis, but also improving the way in which electronic message confirmation data is generated, stored and retrieved and read within a networked computing system to distinguish authentic and potentially malicious electronic messages.

According to one embodiment, a computer implemented method for preventing or combating on-line phishing involves a first computer that hosts an online software application with which users have respective accounts utilized and accessed by respective users and a second computer that manages and updates an activity log involving respective accounts. For a particular user wanting to verify the authenticity of a received electronic message, the online software application generates an electronic message involving the account (such as a message notifying the user of a password update) and also generates independent confirmation data. Certain data of the electronic message such as a message summary, the first few sentences of the body of the message, a subject line and/or timestamp data, are transmitted with the confirmation data to the second computer through a first network. For ease of explanation and differentiation, "logged confirmation" data refers to confirmation data recorded to the activity log hosted by the second computer, and "messaged" data refers to confirmation data (if any) included in an electronic message that is the subject of a request by a user to determine whether or confirm that the electronic message is legitimate.

The second computer may host activity logs for various accounts or users, and in response to receiving the electronic message data and confirmation data from the first computer, the second computer updates an activity log for that user's account such that the confirmation data is associated with or linked to the electronic message data in the activity log. The first computer transmits the electronic message including the confirmation data through a second network to the end user computer, which may be before or after the activity log has been updated. Verification of the source of the electronic message as the host, first computer or online software application rather than a thief that sent a malicious phishing electronic message is based at least in part upon multi-directional transmission of the confirmation data and activity log update concerning same, i.e., whether electronic message includes the confirmation data that was previously recorded to the activity log.

Other embodiments involve computer-implemented methods executed by the first computer or the computer hosting the online software application. For example, one embodiment involves the first computer generating an electronic message and confirmation data and transmitting data of the electronic message and the confirmation data through a first network to a second computer different from the first computer and that hosts an activity log in which computer events involving the account of the end user are recorded, and transmitting the electronic message through a network to the end user computer. In this manner, confirmation that a source of the electronic message was the online software application and not a thief can be performed using the confirmation data recorded in the activity log hosted by second computer and any corresponding reference data of the electronic message received by the user. Yet other embodiments involve computer-implemented methods executed by the second computer hosting the activity log. Further embodiments involve computer-implemented methods executed by a third computer such as a computer utilized by a host representative when receiving a telephone call from a user of the online software application requesting confirmation that a received electronic message is legitimate. Other embodiments may involve execution of actions by multiple computing systems of a networked computing system, e.g., the first or host computer and the second or log computer or the first computer, the second computer and a third computer.

Further embodiments involve networked computing systems for determining whether an electronic message is genuine and from a source of an online software application or host or whether the electronic message is fraudulent and a malicious phishing message. Computerized systems may include one or more or all of a first computer hosting the online software application or user account and that generates the electronic message to be transmitted to the user computer (and which may also generate confirmation data), the second computer that manages and storage of data, retrieval of data from and updates to the activity log such that electronic message data is recorded together with confirmation data, a third computer utilized by a host representative, e.g., following a telephone call initiated by the user, and a confirmation data generator such as a random number generator.

Further embodiments involve an article of manufacture or computer program product comprising a non-transitory computer readable medium embodying instructions executable by a computer to execute a process according to any of the method embodiments of the present invention for determining whether an electronic message is sent from an authentic source or is a malicious phishing electronic message.

In a single or multiple embodiments, confirmation of the source of the electronic message may involve the user logging into the account and subsequent communications between the first computer and the second computer regarding activity log data and whether the messaged data (if any) of the electronic message and provided by the user corresponds to previously logged confirmation data previously recorded in the activity log. Embodiments may also involve the user clicking on a URL link within the electronic message, being directed to a separate website or a security computer specified in the electronic message and subsequent communications between the security computer (or first computer if the first computer hosts the security website) and the second computer regarding activity log data and whether the messaged data of the electronic message corresponds to logged confirmation data previously recorded confirmation data in the activity log.

Embodiments may also involve the user calling the host or customer service telephone number directly (via a known, confirmed phone number), communicating the reference data of an electronic message to the host representative, and subsequent communications between a host representative computer and the second computer regarding activity log data and whether messaged data provided by the user (by voice or interactive menu or touch screen or touchtone entry) corresponds to the logged confirmation data previously recorded to the activity log. In some embodiments, multiple confirmation methods are utilized to further enhance security and user confidence, and may be specified in a particular sequence, e.g., user logs into account first for a first confirmation process, then proceeds to call representative using known, confirmed phone number for a second confirmation process.

In a single or multiple embodiments, the confirmation data is generated by the online software application, which also generates the electronic message. For example, the first computer or the online software application may include or utilize a confirmation data generator in the form of a random number generator. In other embodiments, the random number generator is accessed by the first computer, which issues a request for confirmation data to another computer or on-line resource hosting the random number generator and receives the randomly generated number from the on-line resource in response to the request. Thus, the first or host computer may include a random number generator or access an external random number generator through a network.

In a single or multiple embodiments, the messaged data included in the electronic message and logged confirmation data previously recorded to the activity log is in a hybrid data structure. For example, confirmation data in the form of a randomly generated number in a first format (e.g. pre-determined number of digits, or pre-determined structure, e.g., 12-34-567) is transformed into different, second format including a hybrid data structure including the randomly generated number and pre-determined data identifying the online software application. For example, the confirmation data in the second structure may be in the form of a randomly generated number with a pre-determined online software application data or identifier appended thereto, or integrated within the randomly generated number. For example, for an online software application in the form of an online tax return preparation application such as TURBOTAX tax return preparation application (identified by "TT"), the "TT" identifier may be appended to or integrated within a randomly generated number, e.g., 12-34-567-TT, or T-12-34-567-T, or 12-T-34-T-567. As another example, for an online software application in the form of a computerized financial management system such as QUICKBOOKS financial management system (identified by "QB"), the "QB" identifier may be appended to or integrated within the randomly generated number as 12-34-567-QB, or Q-12-34-567-B, or 12-Q-34-B-567. The hybrid confirmation data is included in the electronic message and also recorded to the activity log such that data of the electronic message is associated with the hybrid confirmation data in the activity log and is communicated in multiple directions to different computing system components or in different directions for subsequent electronic message source authentication.

In a single or multiple embodiments, the account that the user has with the online software application includes an electronic mail address of the user, and the electronic message is an electronic mail message. Pre-determined portions of the electronic message, such as one or more of "To" or "From" fields, "Subject" line data and timestamp data, are recorded to the activity log together with the confirmation data. An electronic mail message may be transmitted by the first or host computer to the user computer directly or through a separate electronic mail server. In a single or multiple embodiments, the account that the user has with the online software application includes a mobile telephone number of the user, and the electronic message that includes the confirmation data is a text or SMS message. Data of the text or SMS message is recorded to the activity log together with the confirmation data. In the case of a text or SMS message, "To" and "From" data may be in the form of telephone numbers.

In a single or multiple embodiments, although not required, activity log recording is completed before the electronic message is transmitted by the first computer to the user computer after the first computer receives confirmation from the second computer that the confirmation data has been recorded to the activity log. Thus, confirmation data for all electronic messages are recorded to the activity log.

In a single or multiple embodiments, after the electronic message including the confirmation data is received by the user, the user may initiate a request to confirm that the electronic message is legitimate and not a phishing message in various ways or through various computing devices that interface with the activity log. For example, after the electronic message is transmitted to the user computer, the user computer executes a browser to access the first computer and the user's account (thus accessing a known host resource) that the user has with the online software application, and the user provides messaged data that was included in the received electronic message after logging into the account.

In response to the received request, the first computer or online software application accesses the second computer through a network and accesses the activity log hosted thereby to determine whether the messaged data received from the end user computer and the logged confirmation data previously recorded to the activity log match, and generates a response indicating whether the online software application is the source of the electronic message that is the subject of the received request. The response is provided to the end user computer in response to the end user computer request. It may be that the electronic message includes no confirmation data, or messaged data that is different than corresponding logged comparison data in the activity log, or messaged data that is the same as the corresponding logged comparison data in the activity log. The electronic message can be designated as potentially malicious for the first two situations, and confirmed as an authentic or legitimate for the third situation.

In a single or multiple embodiments, the electronic message includes a separate or predetermined address of a website of the host of the online software application such that the user can click on or enter the website address to be directed to the website and enter or provide the messaged data in the electronic message. The website server (which may be the first computer or other security computer) accesses the activity log of the second computer or requests data from same to determine whether the logged confirmation data previously recorded to the activity log data and the messaged data received via the website match, in which case the electronic message is designated as authentic and not a fraudulent phishing electronic message. The website may be hosted by the first computer that also hosts the online software application or by a different, third computer such that electronic message source confirmation can be performed through or independently of the user's account.

In a single or multiple embodiments, after the electronic message is transmitted to the user computer, the user may initiate a telephone call to the host. The host may request whether the electronic message includes any message data to be analyzed for message confirmation. If not, the user can be advised that the electronic message is potentially malicious. However, if the electronic message does include messaged data for confirmation (e.g., identified as reference data), then the user provides the messaged data to the host representative, which may be done verbally or via a phone touch screen or keypad, e.g., after navigating IVR menu for entering the messaged reference data, which may be numbers, letters or a combination thereof. A third computer of the host representative communicates with the second computer to access the activity log and determine whether the messaged reference data provided by the user corresponds to the logged confirmation data previously recorded to the activity log for that electronic message. The third computer generates a response indicating whether the electronic message is potentially malicious or that the online software application is the source of the electronic message that is the subject of the received request. The response can be presented to the end user automatically by the third computer or verbally by the host representative after the host representative receives the result of the confirmation analysis.

Thus, depending on the system configuration employed, the host computer may or may not be involved in submitting requests to the log computer or accessing the log computer to determine whether messaged or referenced data of the electronic message received by the user is also present in the activity log.

Embodiments not only address technical problems arising from within the realm of computer networks and electronic communications executed within networked computing systems, but also provide for the ability to effectively and efficiently distinguish fraudulent or phishing messages from legitimate electronic messages via a non-generic arrangement of computing system components and improving how confirmation data is generated, stored to a specific data structure in the form of an activity log, how the activity log is updated, and how activity log data is retrieved or read from an activity log, and transmitted in multiple directions through multiple networks to different computing devices, thus providing for more efficient and effective electronic message confirmation and anti-phishing technologies which make it difficult (if not impossible) to copy by a thief since the thief does not have access to either of the host computer or the log computer. Further, a thief's attempt to copy the layout or content of host website or general e-mail, for example, will not include the independently generated and secure confirmation data and thus such electronic messages by a thief will be identified by embodiments as potentially malicious. Further, the manner in which electronic messages are generated, activity logs are updated and the resulting interface structure of an electronic message that is presented to a user improve the manner in which computers and networked computing systems operate by providing a specific functionality to online software applications, electronic message communications and anti-phishing system that improves the efficiency electronic message confirmation and anti-phishing systems.

BRIEF DESCRIPTION OF THE DRAWINGS

FIGS. 3A-D illustrate examples of how confirmation data for can be structured, wherein FIG. 3A illustrates confirmation data in the form of a randomly generated number, and FIGS. 3B-D illustrate how hybrid confirmation data includes randomly generated number with integrated or appended online software application identification data;

FIG. 5 illustrates an electronic message constructed according one embodiment in that includes reference or confirmation data as a result of multi-directional transmission of generated reference or confirmation data through different networks to different computing devices;

DETAILED DESCRIPTION OF ILLUSTRATED EMBODIMENTS

Figure 1:
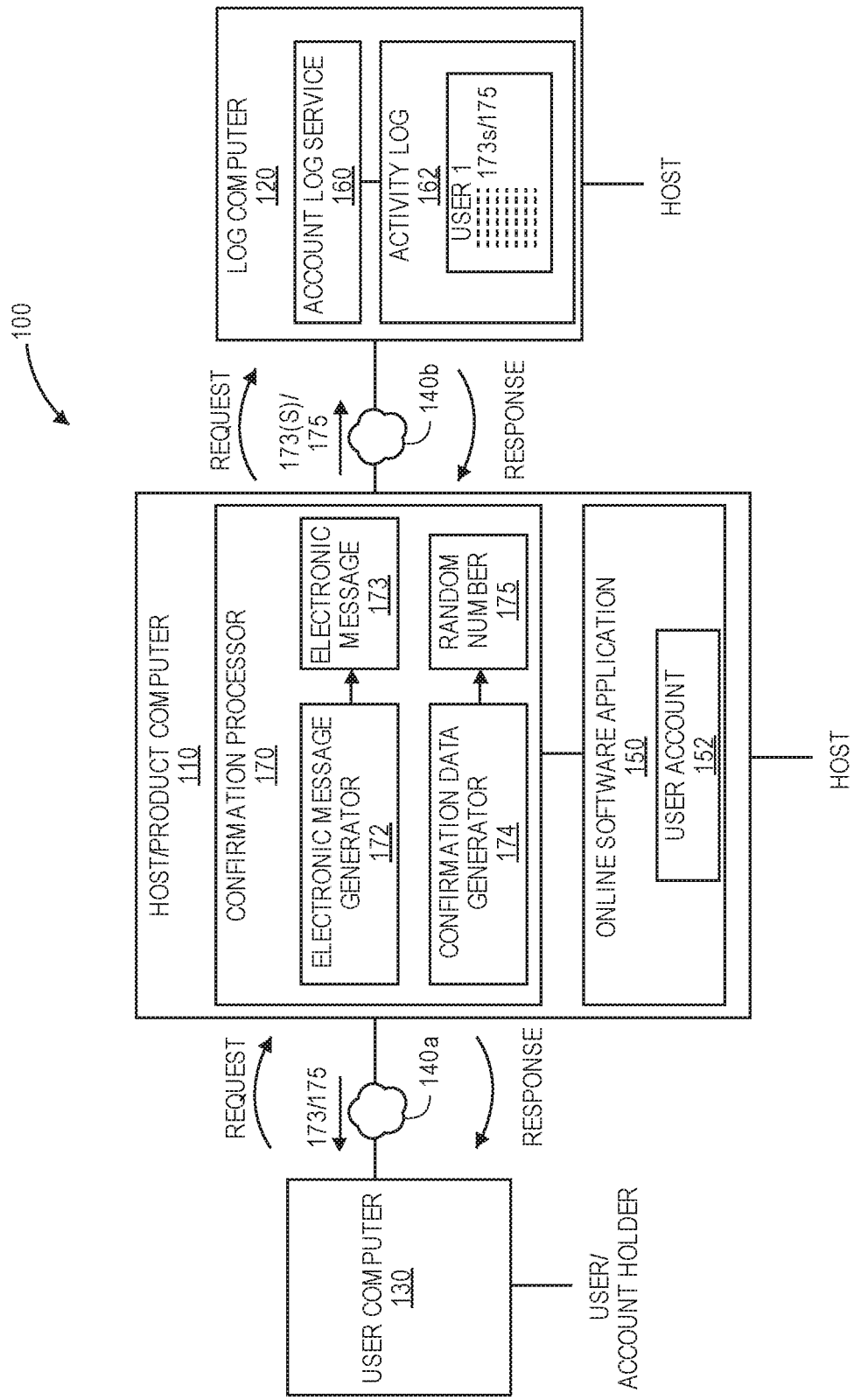
FIG. 1 depicts a networked computing system constructed according to one embodiment for distinguishing legitimate electronic messages from potentially malicious phishing messages.

Embodiments of the present invention provide for new systems and methods to identify potentially harmful electronic messages such as potentially harmful e-mails and text messages. Embodiments provide for improved electronic messaging, on-line security and anti-phishing technologies and provide for more efficient detection of potentially malicious electronic messages and generation, storage and retrieval of message confirmation data.

Embodiments enable valid or authentic electronic messages (e.g., concerning a user's account or credentials) sent from a user's software application, financial institution or other host to be validated or confirmed as authentic, in contrast to fraudulent or malicious electronic messages sent from a thief in an attempt to steal a user's important information (such as credit card, account, personal data, passwords). Embodiments provide these technological improvements by generating source confirmation data that is recorded together with electronic message data to an activity log and transmitted in different directions through different networks to different computing devices. With this system configuration and operation, embodiments provide for an independent verification system in which source confirmation data is separately recorded in an activity log managed by a separate computer such that the data of the electronic message (e.g., pre-determined portion or summary thereof) is associated with the confirmation data in the activity log.

Thus, when a user receives an electronic message involving sensitive information (such as a personal financial management system tax return preparation application or financial institution) and the user is not certain whether the electronic message is legitimate, the electronic message can be determined to be legitimate or potentially malicious based on rules concerning whether the electronic message contains certain data (other than the message content), and whether the certain messaged data corresponds to logged confirmation data previously recorded in the activity log. More specifically, a first rule may specify that an electronic message that does not include a confirmation code is not legitimate, or presumed to be malicious. A second rule may specify that electronic message that includes a confirmation code is potentially malicious depending on data in the activity log hosted by another computer but is determined to be authentic and valid if the confirmation data is also present in the separate activity log. Analysis of electronic message data and activity log data may be performed in response to a user request submitted through the online software application with which the user has an account, through a separate security website provided in the electronic message and that identifies the host in the URL address, or in response to a request made to a customer service representative via a telephone call, e.g., based on a verbal request by the user or by the user entering data via a telephone menu. In response to the request, the activity log is accessed by the requesting or first, or second or host computer to determine whether messaged data provided by the user or determined from the user's request is also present in the user's activity log of the second computer. If so, then the electronic message is determined to be legitimate. If not, then the electronic message status is maintained as potentially malicious. Thus, embodiments utilize multi-directional confirmation data transmission through different networks to different computing devices to provide technical solutions to problems arising within the realm of networked computing systems including malicious electronic messages or phishing and to identify potentially malicious messages in a more efficient manner. Various embodiments and aspects thereof are described in further detail with reference to FIGS. 1-12.

Referring to FIG. 1, a networked computing system 100 constructed according to one embodiment includes an intermediate host or online software product computer 110 (referred to as a first or host computer) in communication with a log management computer 120 (referred to as a second or log computer) and with a computer 130 of a user through respective different networks 140*a* and 140*b* (generally, network 140). Examples of networks 140 discussed herein that may be utilized for communications between system components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 140 generally, but various networks, combinations of networks and communication systems, methods and protocols may be utilized depending on the system components employed.

In the illustrated embodiment, the first computer 110 hosts an online software product or application 150 with which a user has an account 152. For example, the first computer 110 may be a computer of a financial institution, and the online software application 150 is utilized for online banking, and the account 152 is a financial account that the user has with the financial institution. As another example, the first computer 110 may be a computer of a host of an online software application 150 such a tax return preparation application (such as turbotax.com) or an online financial management system (such as quickbooks.com or mint.com). For ease of explanation, reference is made generally to an online software application 150 and account 152 thereof. An account 152 may include various types of sensitive, confidential or financial information depending on the type of online software application 150 and account 152. For example, account 152 information may include a user's name, address, birthdate, social security number, credit card numbers, financial account numbers and credentials such as user name and password.

The second computer 120 hosts an account log service 160 that interfaces with the host computer 110 and other computing devices and manages access and updates to an activity log 162. An activity log 162 includes updates concerning user account 152 events that are sequentially ordered and displayed. Various account 152 activities may be recorded to the activity log 162, and different types of activities may maybe recorded depending on the type of account 152 and online software application 150 utilized. For example, an activity log 152 may indicate one or more of dates, times and locations of user activities such as when a user signed in and signed out from the account, verification of security or personal data such as a phone number, address data or security questions, chat sessions, and electronic messages.

While FIG. 1 illustrates a single host computer 110 in communication with a single user computer 130, it will be understood that embodiments may involve respective users having respective accounts 152 managed by the host computer 110, the host computer 110 may host accounts 152 for one or multiple online software applications 150, or additional host computers 110 may host accounts 152 for other online software applications 150. Further, there may be a separate log computer 120 and activity log 162 for each host computer 120 or each online software application 150. Accordingly, it will be understood that FIG. 1 is provided for purposes of illustration and explanation, not limitation. Moreover, while FIG. 1 illustrates one activity log 162 for a particular user or account 152 thereof, it will be understood that computer 120 may host respective activity logs 162 for respective accounts 152 of respective users of the online software application 150. The host computer 110 may host thousands or millions of accounts 152 for various users for various online software applications 150.

With continuing reference to FIG. 1, in the illustrated embodiment, the host computer 110 includes a source confirmation processor 170 that includes or utilizes an electronic message generator 172 and confirmation data generator 174. Source confirmation processor 170 is configured, programmed or operable to access the log computer 120 and activity logs 162 managed thereby, or to interact with a log management service 160 that is configured, programmed or operable to update the activity log 162 and access and search the activity log 162 and provide selected activity log 162 data in response to a request concerning whether certain data is included in an activity log 162 for a specified account 152.

Figure 2:
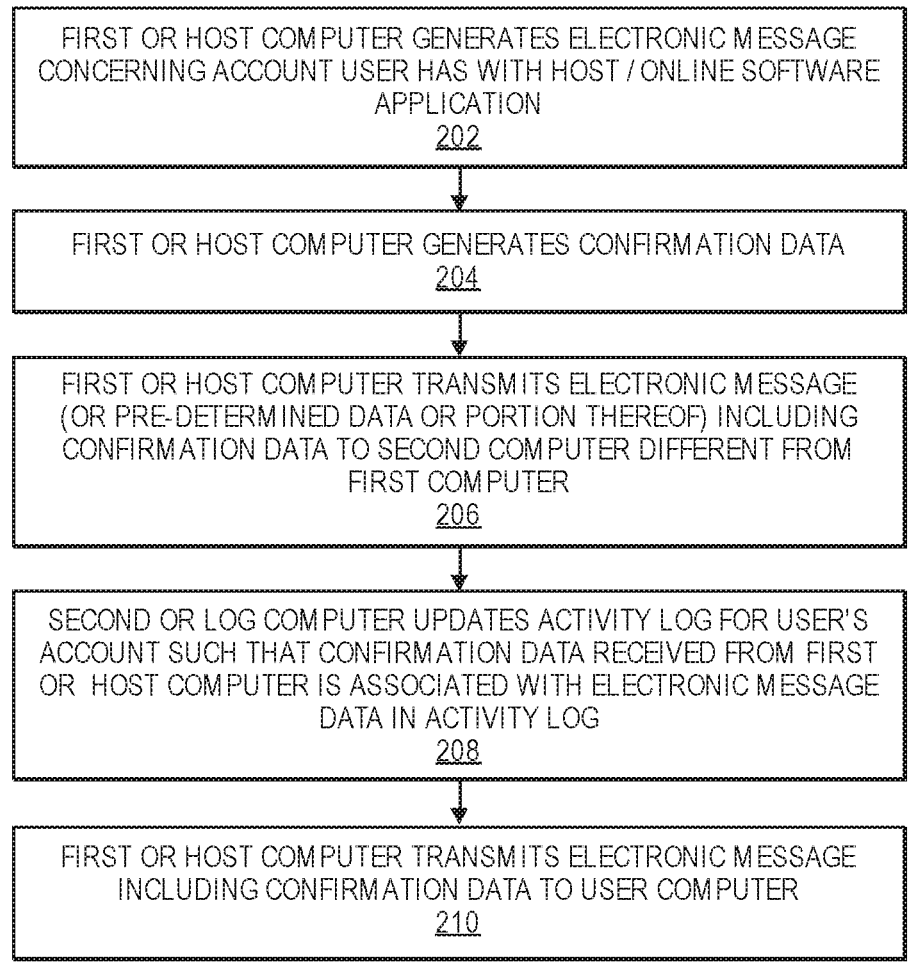
FIG. 2 is a flow diagram of an algorithm for one embodiment of a computer-implemented method for distinguishing legitimate electronic messages from potentially malicious phishing messages.

Referring to FIG. 2 and with continuing reference to FIG. 1, according to one embodiment, at 202, the first or host computer 110 generates an electronic message 173 concerning an account 152 that the user has with the host or online software application 150. The electronic message generator 172 used for this purpose may be in the form of an electronic mail generator or program or a text or SMS message generator or program. Different types of electronic message generators 172 may be utilized depending on the method of electronic communication employed. For ease of explanation, reference is made to an electronic message 173, which may be an electronic mail, SMS or other type of electronic message.

Continuing with reference to FIG. 2, at 204, the first computer 110 generates confirmation data 175. For this purpose, the first computer 110 may host a confirmation data generator 174 as shown in FIG. 1, or the host computer 110 may access a confirmation data generator 174 through a network or hosted by another computing system (not illustrated in FIG. 1). According to one embodiment, the confirmation data generator 174 is a random number generator (or a pseudorandom number generator (PRNG) or deterministic random bit generator (DRBG), which generates confirmation data 175 in the form of a random sequence of numbers or bits, such as a randomly generated number.

Figure 3A:
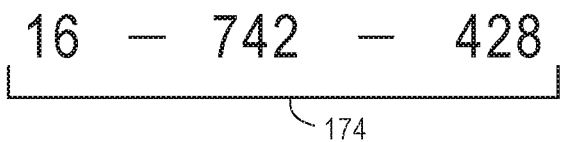
Figure 3B:
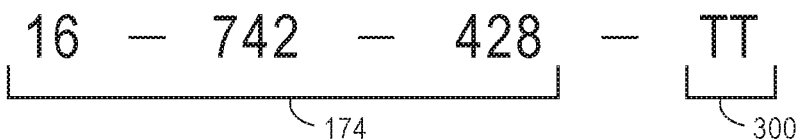
Figure 3C:
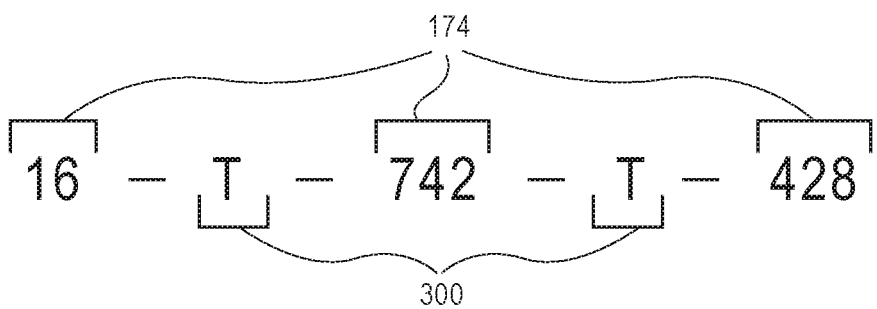
Figure 3D:
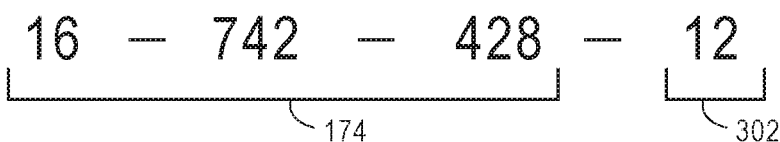

FIGS. 3A-D illustrate examples of how confirmation data 175 may be structured based on an output generated by a random number generator 174 for eight digit confirmation data 175 (as an example—other confirmation data types and configurations may be used). FIG. 3A illustrates confirmation data 175 including numerical data, but confirmation data 175 may include alpha and/or numerical data and different numbers of bits such that FIG. 3A is provided for purposes of illustration, not limitation. FIGS. 3B-D illustrate different ways that other data may be embedded in or appended 300 to a randomly generated number 175. This embedded or appended data 300 may, for example, be used to identify the online software application 150 for which the randomly generated number 175 was generated.

For example, in the embodiment illustrated in FIG. 3B, and in which the online software application 150 is TURBOTAX tax return preparation application (identified by "TT"), the "TT" indicator 300 may be appended to the end of the randomly generated number 175 (as shown in FIG. 3B), integrated within the randomly generated number 300 at pre-determined locations thereof (as shown in FIG. 3C), or other codes or indicators 302 that are used to identify TURBOTAX tax return preparation application or turbotax.com may be appended or embedded within the randomly generated number 175 (as shown in FIG. 3D, in which the code "##" is used to identify TURBOTAX tax return preparation application). The host may use various identifiers or codes for different online software applications 150, e.g., "12" for a certain tax return preparation application, "21" for a certain financial management system, and so on. Thus, the confirmation data 175 that is eventually utilized may be a randomly generated number or a result of transforming the randomly generated number or confirmation data 175 in a first format into a second or different, hybrid format. The second or different, hybrid format may involve online software application 150 identification data is integrated in or appended to a randomly generated number to provide additional context regarding the electronic message 173 to which the confirmation data will eventually be associated.

Referring again to FIG. 2, at 206, the first computer 110 transmits the electronic message 173 or selected data thereof (identified as 173s, where "s" refers to "selected" data of electronic message 173) with the confirmation data 175 to second computer 120. According to one embodiment, the electronic message data 173s may include, for example, one or more of a subject line, "to" and "from" names (or phone number in the case of a text or SMS message), timestamp data, and one or more words or sentences from the body of the electronic message 173. At 208, the second computer 120 receives the electronic message data 173s and the confirmation data 175 from the first computer 110, identifies an activity log 162 for the user identified in the electronic message data 173, and updates the user's activity log 162 to include the electronic message data 173s and confirmation data 173 associated with or linked to the electronic message data 173s.

Figure 4:
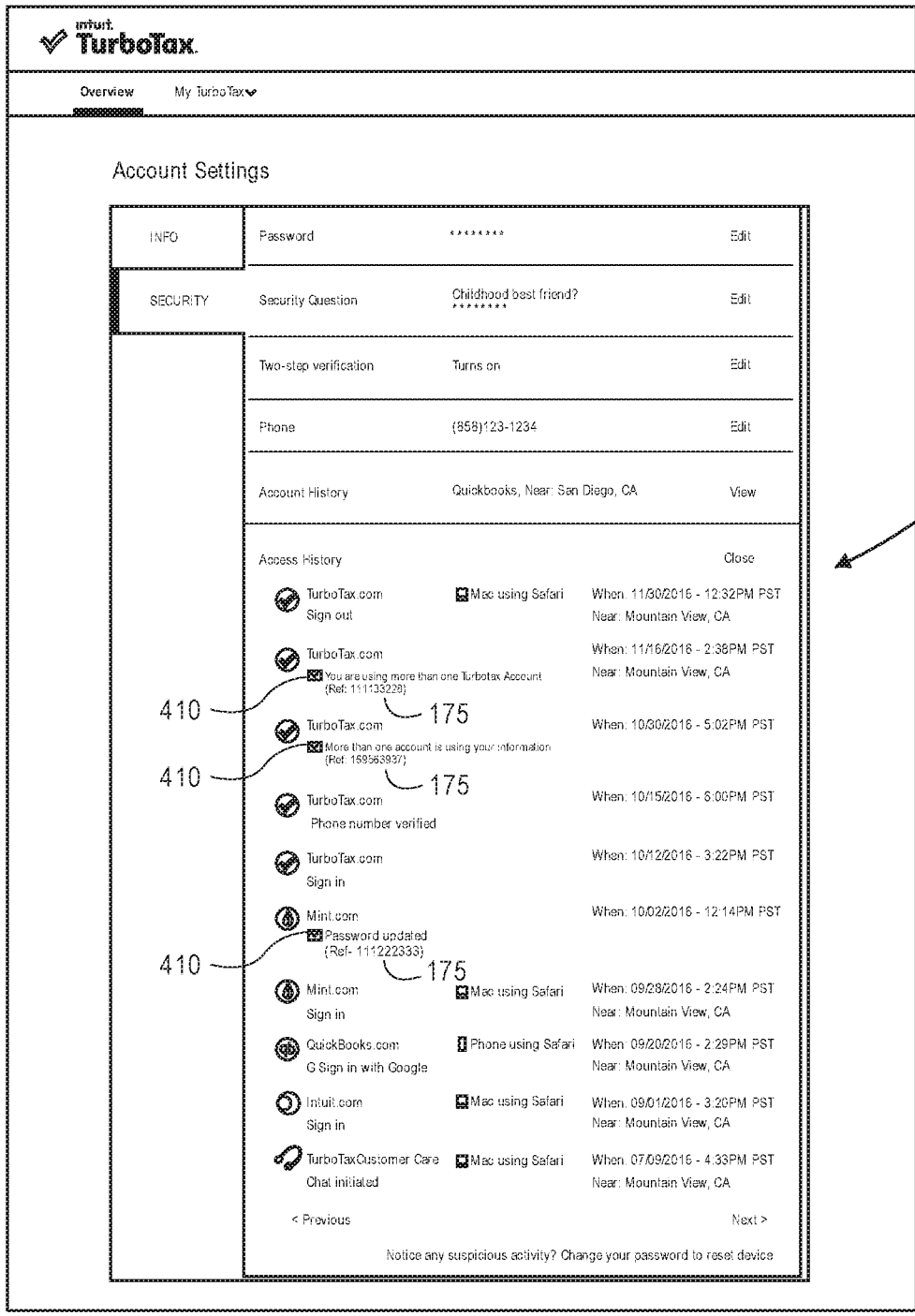
FIG. 4 illustrates an activity log constructed according to one embodiment including log entries for data of electronic messages sent to a user associated with generated confirmation data.

Referring to FIG. 4, an example of an activity log 162 is illustrated and is in the form of a report that includes updates concerning user account 152 events that are sequentially ordered and displayed. For example, an activity log 162 for the user's account 152, identified as "Account History" may indicate one or more of dates, times and locations of user activities such as when a user signed in and signed out from the account 152, verification of security or personal data such as a phone number, address data or security questions, chat sessions initiated and, according to embodiments, logged electronic messages, which may involve, for example, requests for information or confirmation of certain account data, notifications concerning the user's account 152, which may involve one or multiple online software applications 150 (in cases in which the same user account 152 can be used to access multiple online software applications 150), and which are sent to a user and associated with the confirmation data 175.

For example, in the illustrated embodiment, confirmation data 175 (identified as "Ref: ##########"), is generated and associated with electronic communications (identified by envelope icon 410) to the user involving various account activities, while other logged account activities are not associated with generated confirmation data 175. The illustrated activity log 162 indicates that an electronic message 173a was sent on Oct. 30, 2016 from a location near Mountain View, Calif. concerning "You are using more than one TurboTax Account" or a general subject, summary or paraphrasing (as shown in FIG. 4, "Your TurboTax Account") and that is associated with confirmation data 175a "Ref: 111132231," and another electronic message 173b concerning a different online software application 150 of Mint.com that was sent was sent on [date] from a location near Mountain View, Calif. that involved "Password updated" and that is associated with separate confirmation data 175b of "Ref: 111223331." Thus, FIG. 4 illustrates respective confirmation data 175a,b generated for respective electronic messages 173a,b, and the second computer 120 improving how activity log 162 data including data concerning electronic messages 173 and generated confirmation data 175 is stored to and associated with each other in the activity log 162.

Referring again to FIG. 2 and with further reference to FIG. 5 for when an authentic or legitimate message is transmitted, at 210, the first computer 210 transmits an authentic or legitimate electronic message 173 including the confirmation data 175 to the user computer 130. In the embodiment illustrated in FIG. 5, the electronic message 173 is in the form of an electronic mail message, which is includes a "TO" field, a "FROM" field and a "SUBJECT" field which, in this example, involves an online software application 150 of a tax return preparation application such as turbotax.com. In the illustrated example, the subject is "Your Turbo Tax Account" and other subjects may be more specific such as "You are using more than one TurboTax account." According to one embodiment, the subject or portion thereof, as shown in FIG. 4, is a subject entry ("e.g., You are using more than one TurboTax account") in the activity log 162 for the user's account 152. The electronic mail message 173 also includes a body including the message or e-mail content with more details, and a footer which, for an authentic electronic message 173 from the host, includes messaged or referenced data 175/575 of the confirmation data 175 previously bi-directionally transmitted according to embodiments. A message that does not include messaged or referenced data 175/575 may be a phishing message from a thief. The footer or other section may also include a separate website 580 that the user can click on with a message that the website 580 address should always have the host name included (e.g., address should include intuit.com for the examples of the online software applications noted above). While FIG. 5 illustrates the electronic message 173 in the form of an electronic mail message, embodiments may also be utilized with electronic messages 173 in the form of a text or SMS message sent to the user's mobile communication device or smartphone.

Figure 6:
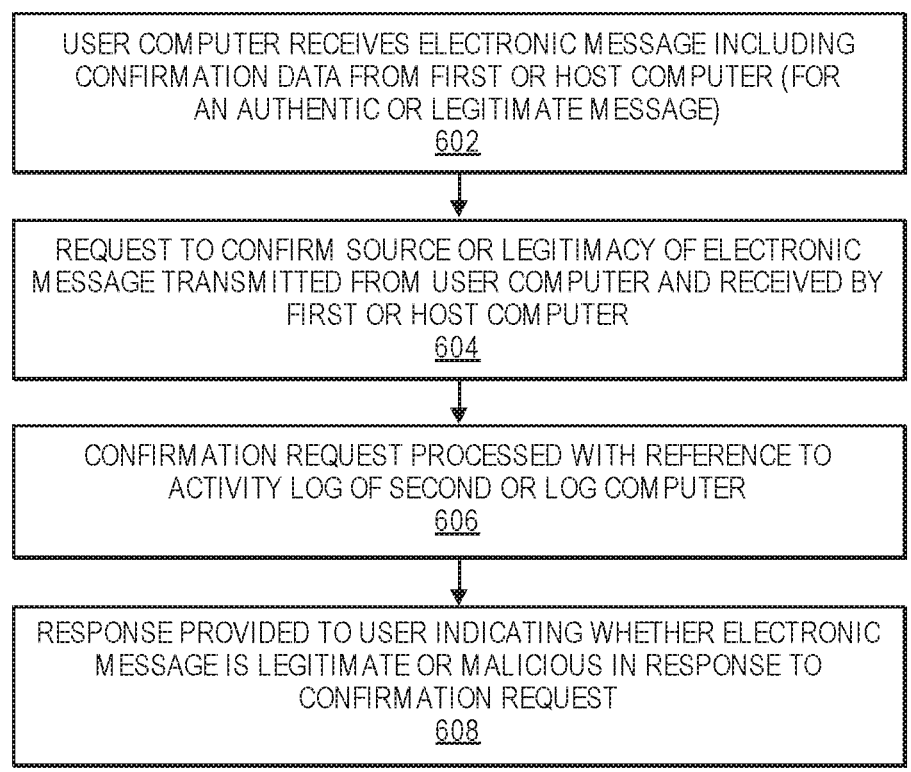
FIG. 6 is a flow diagram of an algorithm for one embodiment of a computer-implemented method for processing a user request regarding whether an electronic message received by a user is authentic or potentially malicious.

With continuing reference to FIG. 6, at 602, with the user computer 130 receiving the electronic mail message 173 (or SMS message if communication via a mobile communication device) from the first computer 110, then at 604, the user, through the user computer 130 or mobile communication device, reviews the electronic message 173 (or other electronic message purporting to be from the host but from a thief), and submits a request from the user computer 130 to the first or host computer 110 (or as described below, calls a host representative) to confirm the source or legitimacy of electronic message 173 received at the user computer 130. The request is received by the first computer 110, and at 606, the user's confirmation request is processed with reference to activity log 162 for the user or account 152 hosted by the second computer 120. At 608, a response to the confirmation request is provided to the user computer 130 indicating whether the electronic message that is the subject of the confirmation request is legitimate or whether the electronic message is a potentially malicious, phishing message.

Figure 7:
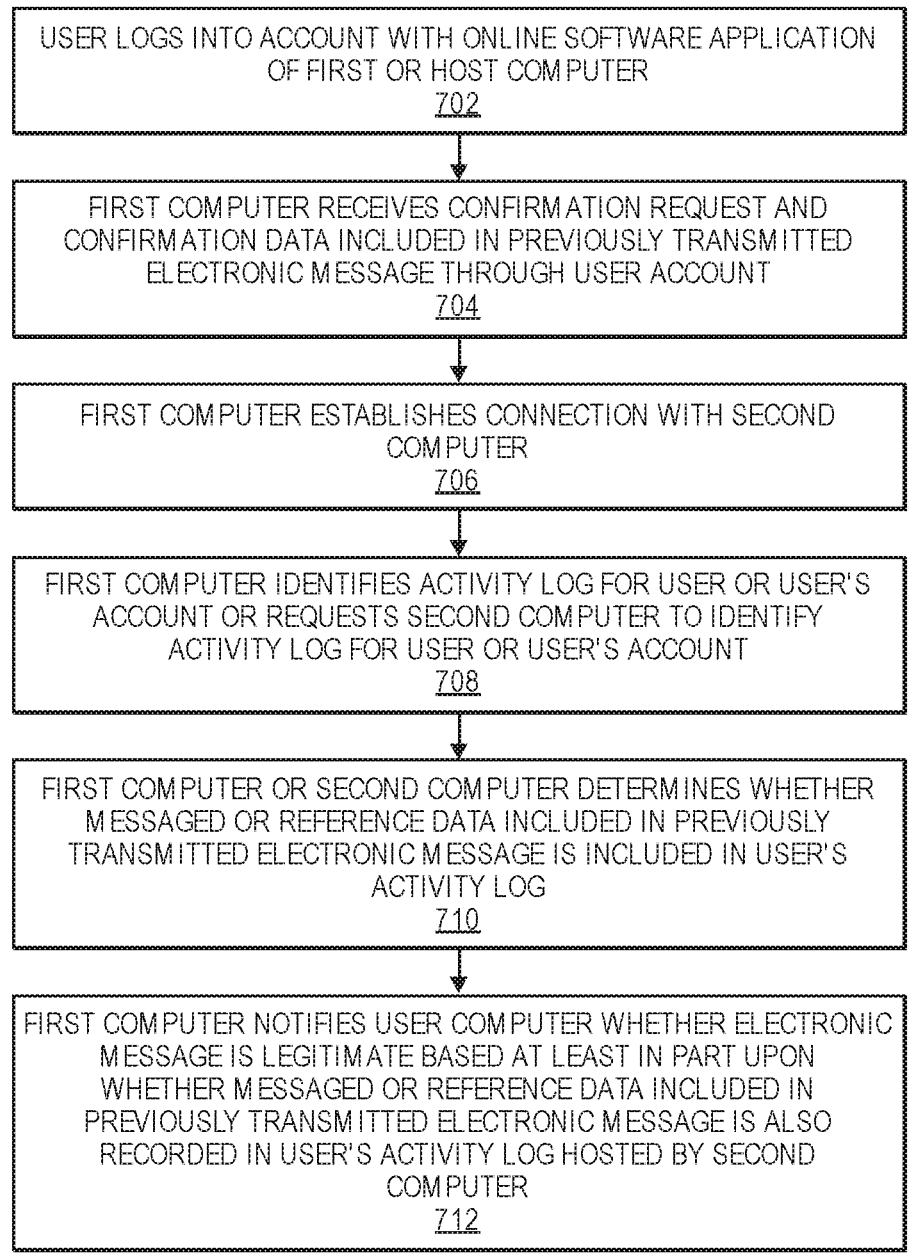
FIG. 7 is a flow diagram of an algorithm for one embodiment of a computer-implemented method for processing a user request regarding whether an electronic message received by a user is authentic or potentially malicious that is submitted through an online software application utilized by the user.

Referring to FIG. 7, according to one embodiment, a confirmation request is made through the user's account 152 with the host or online software product 150, i.e., the user logs into the account 152 to submit a request. A request maybe submitted through an interview screen generated by the online software product 150. In the illustrated embodiment, at 702, a browser (such as GOOGLE CHROME, INTERNET EXPLORER and FIREFOX browsers) may be executed by the user computer 130 to access to the first computer 110, and the user logs into the account 152 that the user has with the online software application 150 of first or host computer 110. At 704, the first computer 110 receives the confirmation request, which may include messaged or reference data 575 to be analyzed. At 706, in response to the received request, the first computer 110 establishes a connection with the second or log computer 120, and at 708, the first computer 110 identifies the activity log 162 for the user or account hosted by the second computer 120, or requests the second computer 120 to identify the user or account activity log 162.

At 710, a determination is made whether the electronic message 173 is authentic or legitimate (from the first or host computer 110) based at least in part upon whether messaged or reference data 575 received from the user computer 130 is the same as logged confirmation data 175 previously recorded to the user's activity log 162, and if so, then the confirmation processor 170 can confirm that the electronic message 173 is legitimate and not malicious as a result of matching data 175/575. At 712, the first computer 110 provides a notification to the user computer 130 regarding whether the electronic message 173 is authentic or legitimate and from the host or first computer 110 based at least in part upon whether messaged or reference data 575 and user's activity log 162. For these purposes, the confirmation processor 170 of the first computer 110 may access and search the activity log 162 hosted by the second computer 120, or the second computer 120 may receive messaged or reference data 575 of the electronic message 173 from the first computer 110 and search the activity log 162 for matching confirmation data 175.

Figure 8:
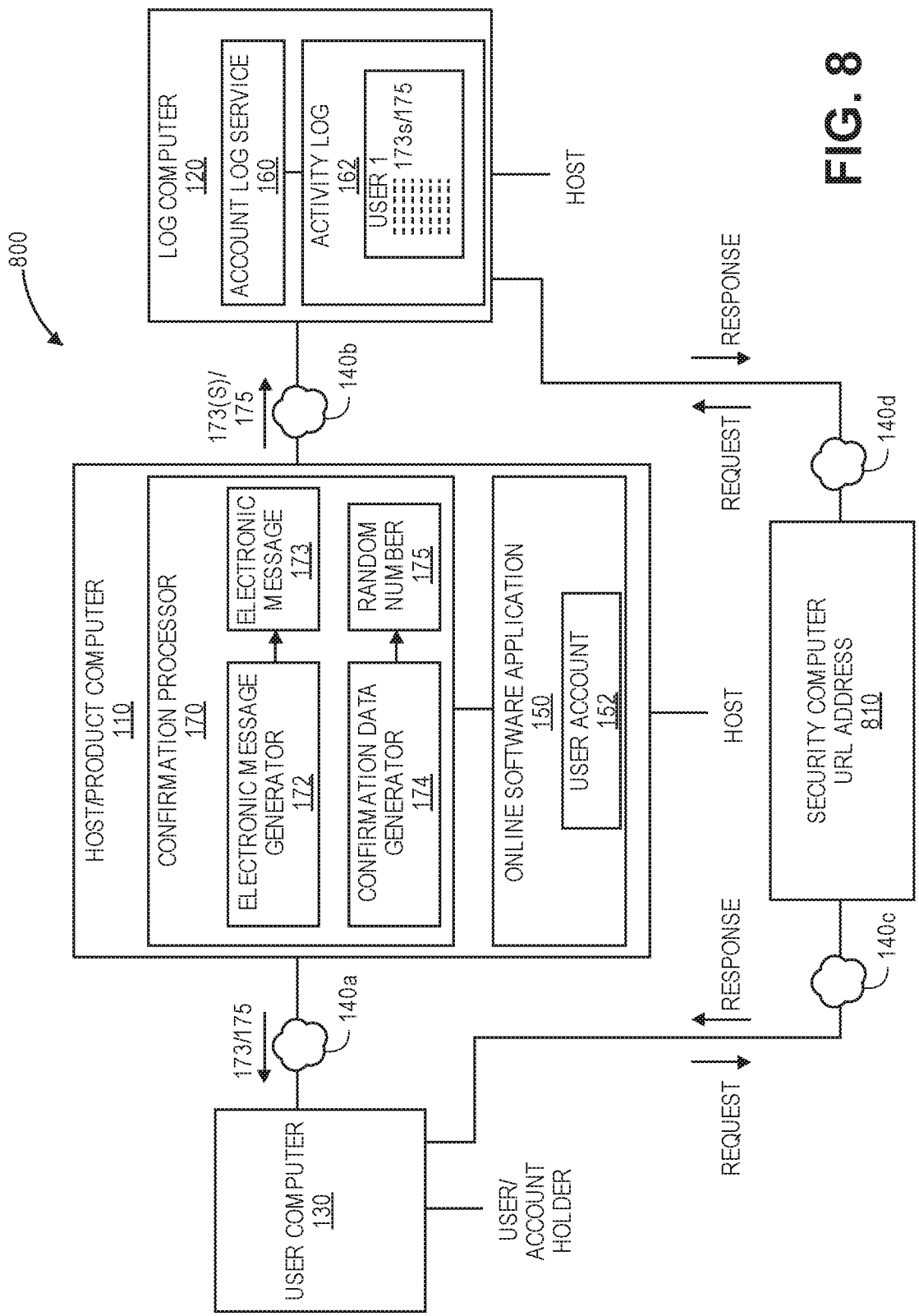
FIG. 8 depicts a networked computing system constructed according to one embodiment for distinguishing legitimate electronic messages from potentially malicious phishing messages for embodiments in which confirmation requests are submitted through an online software application utilized by the user.
Figure 9:
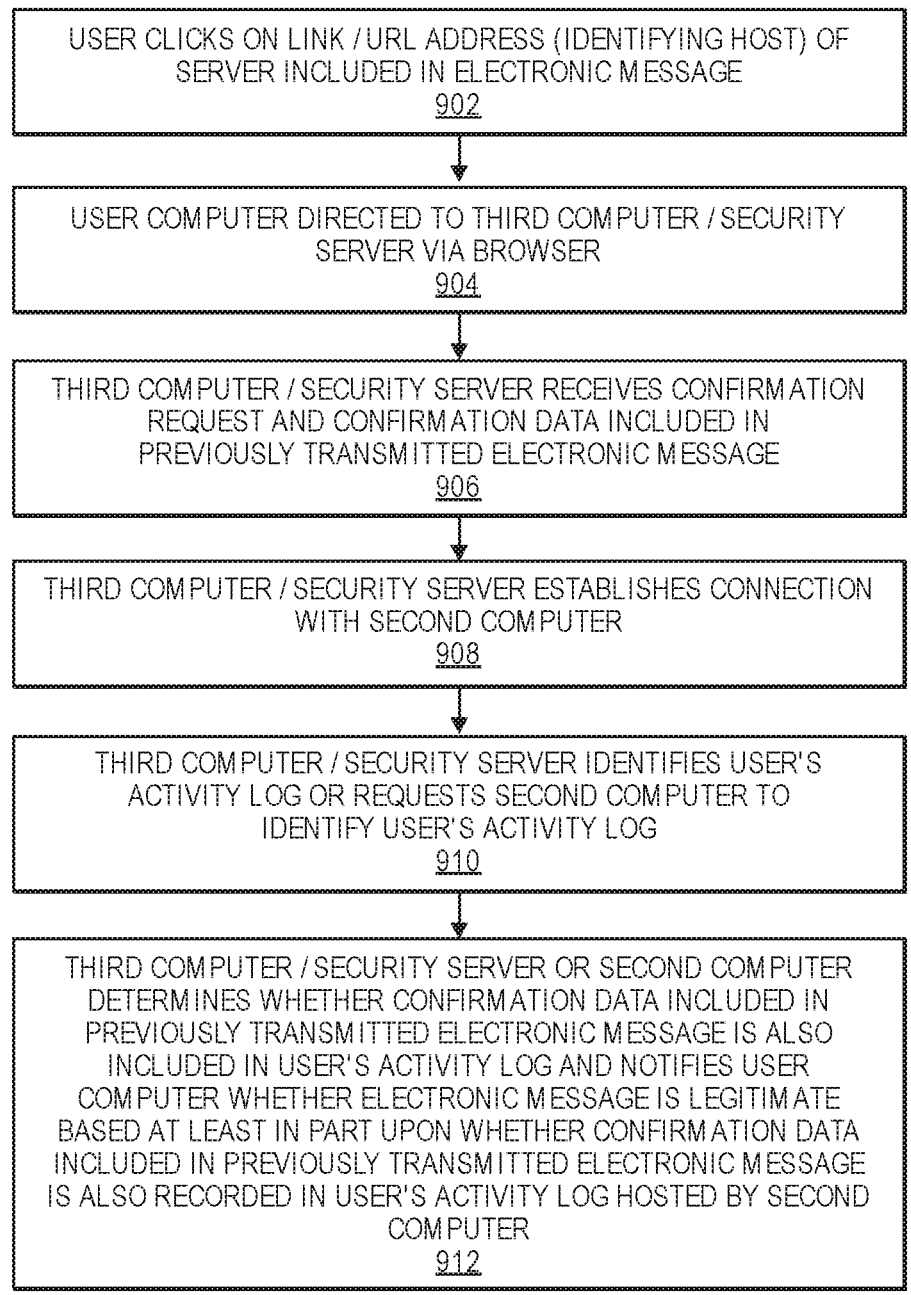
FIG. 9 is a flow diagram of an algorithm for one embodiment of a computer-implemented method for processing a user request regarding whether an electronic message received by a user is authentic or potentially malicious that is submitted through a security server to which the user is directed following clicking on a web address in the electronic message.

Referring to FIGS. 8-9, in a system 800 constructed according to another embodiment, the confirmation request and messaged or reference data 575 are submitted by the user through a separate website 580 that is provided within the electronic message 173, which may also instruct the user that the website address should include a name of the host of the first computer 110. With these embodiments, as shown in FIG. 8, the user computer 130 and the first or host computer 110 are in communication with each so that the user can access the account 152 as described above, and when the user clicks on the web address in the electronic message 173, the user is directed to another computer, or a security computer 810 through a network 140c, which interfaces with the second or log computer 120 through network 140d. In this manner, the user can still request confirmation that the electronic message 173 is legitimate, but is not required to access the account 152, and does not access the second or log computer 120 directly.

With continuing reference to FIG. 8 and with further reference to FIG. 9, at 902, the user clicks on a link or/URL address 580 (e.g., as shown in FIG. 5 that identifies the host, e.g., xxxxx.intuit.com, e.g., determined by visiting the host's website or the host previously providing the address to the user, or the user calling the host and the host advising the user of the special purpose website) of a security computer 810 included in the electronic message 173, and at 904, the user computer 130, e.g., via a browser, is directed to the security computer 810. The electronic message 173 may instruct the user to use a mouse or other input device to initially hover over the displayed URL address 580 to check whether a different URL address is displayed, i.e., to ensure check whether what appears to be a valid address being displayed, but if clicked, the user would be directed to a fraudulent URL address that is displayed when hovering over the URL address.

The security computer 810 receives the confirmation request and messaged or reference data 575 (if included) in the previously transmitted electronic message 173 at 906, and at 908, establishes a connection with the second computer 120 through a network 130c. At 910, the security computer 810 may access and search the activity log 162 hosted by the second computer 120, or the second computer 120 may receive the messaged or reference data 575 from the security computer 810 and search the activity log 162 for matching confirmation data 175. With both embodiments, at 912, a determination is made whether the electronic message 173 that is the subject of the user' request is authentic or legitimate (i.e., from the host or online software application 150), and the security computer 810 responds to the user's request indicating whether the electronic message 173 is authentic or legitimate based at least in part upon the messaged or reference data 575 and confirmation data 175 in the activity log 162.

Figure 10:
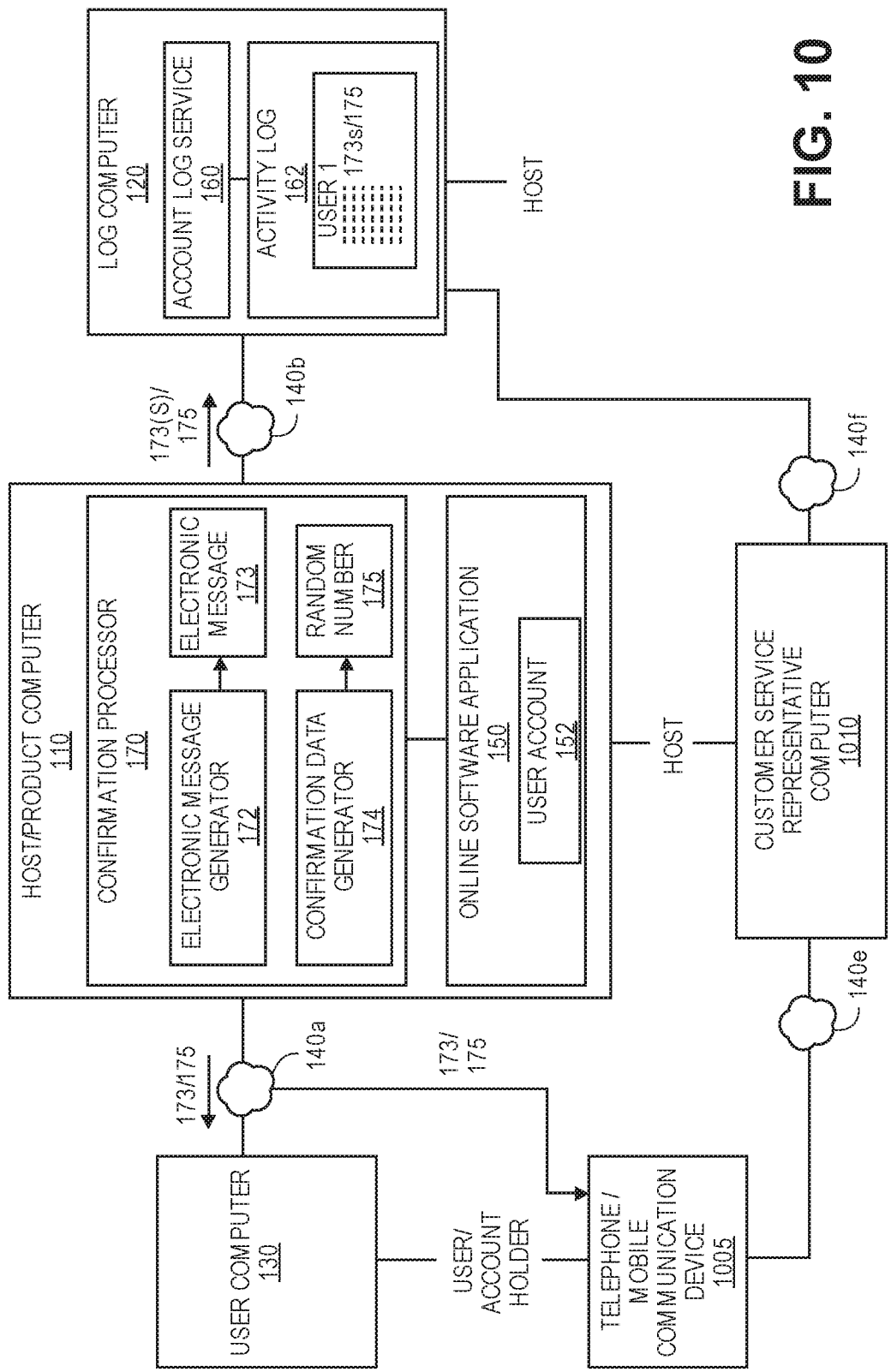
FIG. 10 depicts a networked computing system constructed according to one embodiment for distinguishing legitimate electronic messages from potentially malicious phishing messages for embodiments in which confirmation requests are submitted through a communication device such as a telephone by keypad or touch screen entry, navigation and entry of data through an interactive menu and/or speaking with a representative of the host.
Figure 11:
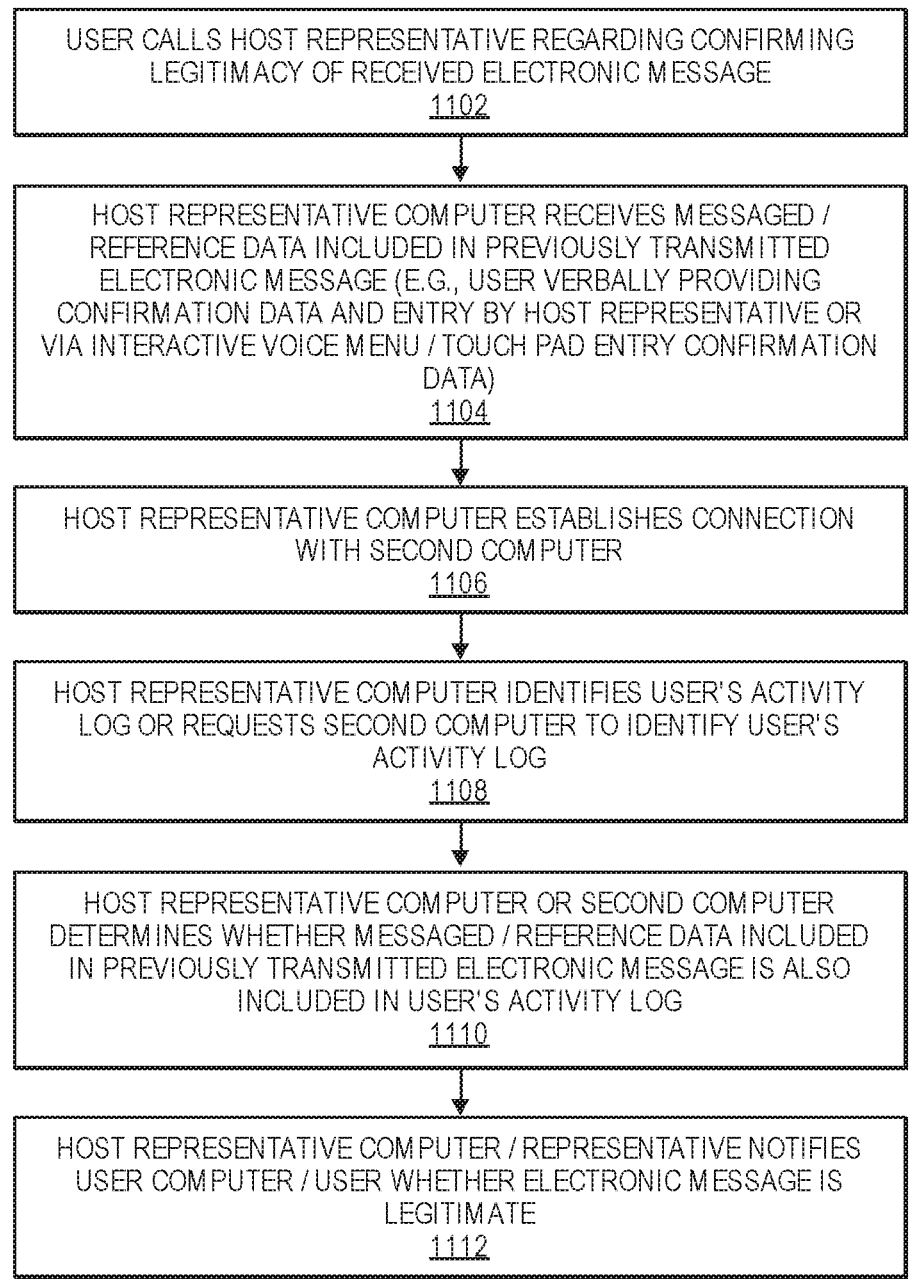
FIG. 11 is a flow diagram of an algorithm for one embodiment of a computer-implemented method for processing a user request regarding whether an electronic message received by a user is authentic or potentially malicious that is submitted through a communication device such as a telephone by keypad or touch screen entry, navigation and entry of data through an interactive menu and/or speaking with a representative of the host.

Referring to FIGS. 10-11, in another embodiment, the confirmation request and messaged/reference data 575 are submitted by the user through a telephone communication using a number known by the user to be valid and an actual number of the host (e.g., determined by visiting the host's web site or the host previously providing the number to the user). With these embodiments, as shown in FIG. 10, the user computer 130 and the first or host computer 110 are in communication with each other so that the user can access the account 152 and the first computer 110 and the second computer 120 are in communication with each other for activity log 162 updates as described above, and the user, e.g., via a telephone or mobile communication device 1005, has placed a telephone call to a customer service representative of the host through a network 140e The user's telephone call is received by the representative's telephone or computing device 1010, which is also in communication or with the second computer 120 through a network 140f In this manner, the user can still request confirmation via a telephone call without accessing the second computer 120 directly, and the user is not required to access the account 152.

With continuing reference to FIG. 11, at 1102, after receiving the electronic message 173 and wanting to confirm the legitimacy of the electronic message 173, the user calls host representative regarding confirming the received electronic message 173, and at 1104, the host representative or representative computer 1010 receives messaged or reference data 575 included in the previously transmitted electronic message 173. The user may provide the messaged or reference data 575 may be by the user verbally providing messaged or reference data 575 to the representative who then enters the messaged or reference data 575 into the representative computer 1010, the user separately e-mailing or texting the messaged or reference data 575 to the representative based on an e-mail address or phone number provided by the representative, or by entry of messaged or referenced data 575 by the user navigating and/or speaking during navigation of an interactive voice menu, which may involve using a touchpad or touchscreen for selection of menu items and/or entry of the messaged or reference data 575 to be analyzed.

At 1106, the representative computer 1010 establishes a connection with second computer 120, and at 1108, identifies the user's activity log 162 or requests second computer 120 to identify user's activity log 120. The representative computer 1010 may access and search the activity log 162 hosted by the second computer 120, or the second computer 120 may receive the messaged or reference data 575 from the representative computer 1010 and search the activity log 162 for matching confirmation data 175. With both embodiments, at 1110, the representative computer 1010 or second computer 120 determines whether messaged or reference data 575 included in previously transmitted electronic message 173 is also included in user's activity log 162, and at 1112, the representative computer 1010 notifies the user computer 130 whether electronic message 173 is authentic or legitimate or the user notified by representative by telephone based at least in part upon the messaged or reference data 575 and logged confirmation data 175 previously recorded to the activity log 162.

Figure 12:
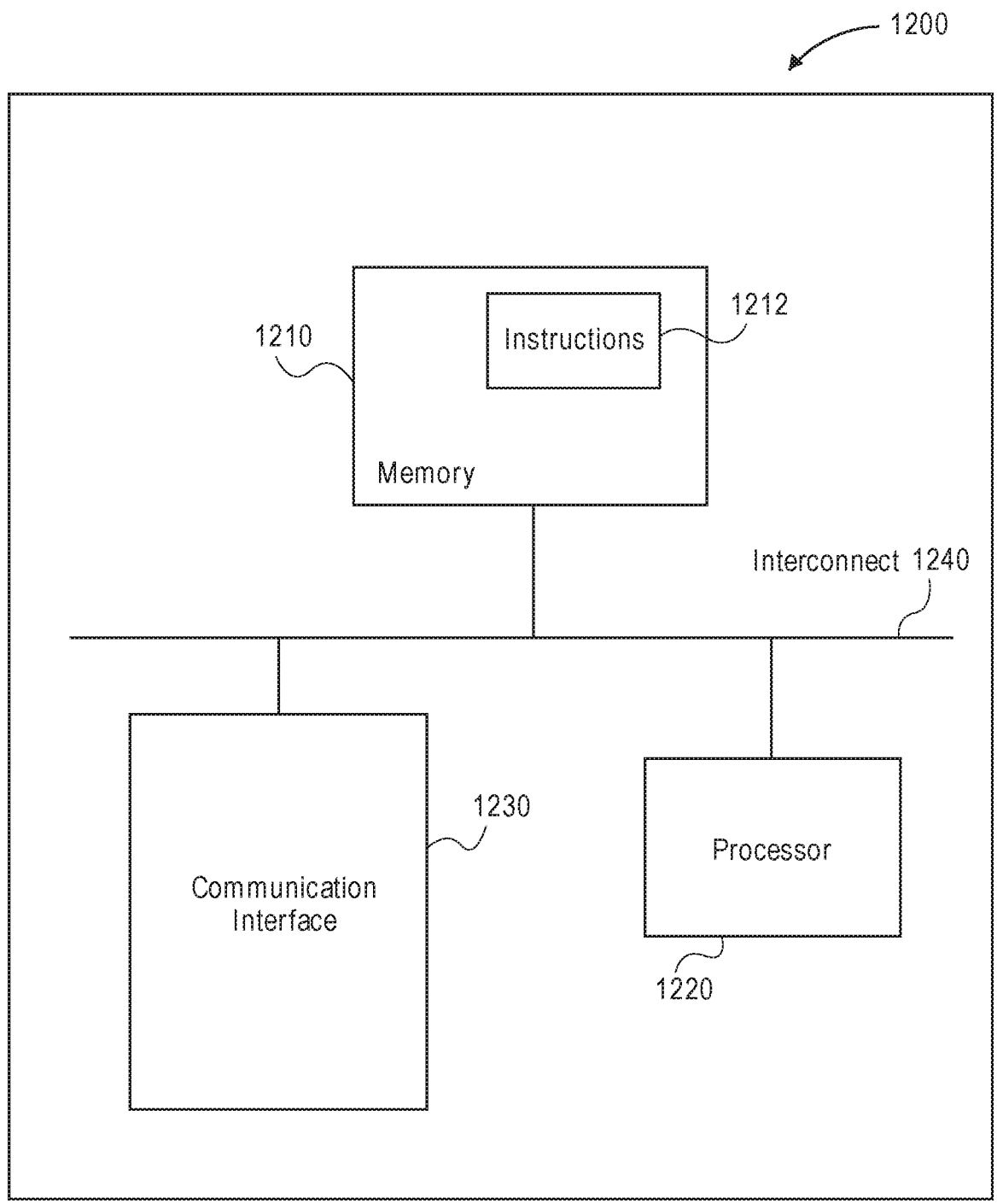
FIG. 12 illustrates generally the components of a computing device that may be utilized to execute in a tax return preparation system for preparing a tax return in which tax questions may be presented in an ad hoc manner.

FIG. 12 generally illustrates components of a computing device 1200 that may be utilized to execute embodiments and that includes a memory 1210, account processing program instructions 1212, a processor or controller 1220 to execute instructions 1212, a network or communications interface 1230, e.g., for communications with a network or interconnect 1240 between such components. The memory 1210 may be or include one or more of cache, RAM, ROM, SRAM, DRAM, RDRAM, EEPROM and other types of volatile or non-volatile memory capable of storing data. The processor unit 1220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1240 may include a system bus, LDT, PCI, ISA, or other types of buses, and the communications or network interface may, for example, be an Ethernet interface, a Frame Relay interface, or other interface. The network interface 1230 may be configured to enable a system component to communicate with other system components across a network which may be a wireless or various other networks. It should be noted that one or more components of computing device 1200 may be located remotely and accessed via a network. Accordingly, the system configuration provided in FIG. 12 is provided to generally illustrate how embodiments may be configured and implemented.

Method embodiments may also be embodied in, or readable from, a non-transitory, computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1220 executes program instructions 1212 within memory 1210 and/or embodied on the carrier to implement method embodiments. Further, embodiments may reside and execute on a mobile communication device such as a cellular telephone or smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, it will be understood that embodiments may involve activity logs for a single user or multiple users, or one or more accounts for different online software applications. Further, it will be understood that confirmation data received in an electronic message can be communicated to a host system in different ways and to different host computing devices, whether to a host computer or online software application directly or via a customer service representative computer or via a telephone menu.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A computer-implemented method, comprising:
a first computer generating an electronic message, wherein the first computer hosts an online software application accessible by a computer of an end user over a first network, the end user having an account associated with the online software application;
the first computer, by the online software application, generating confirmation data associated with the electronic message, the confirmation data having a hybrid data structure comprising a randomly generated number and a pre-determined data for identifying the online software application hosted on the first computer;
the first computer, by the online software application, transmitting electronic message data and the confirmation data through a second network to a second computer different from the first computer;
the second computer updating an activity log associated with the end user's account to record the electronic message data and the confirmation data linked to the electronic message data associated with the online software application hosted on the first computer; and
the first computer transmitting the electronic message including the confirmation data through the first network to the end user computer to enable a confirmation that a source of the electronic message was the online software application and that the electronic message is not a fraudulent phishing electronic message.

2. The computer-implemented method of claim 1, wherein the confirmation data is generated by a confirmation generator of the first computer.

3. The computer-implemented method of claim 1, further comprising:
 the first computer transmitting a request through a third network to an online resource comprising a random number generator; and
 the first computer receiving the confirmation data comprising a randomly generated number in response to the request.

4. The computer-implemented method of claim 1, further comprising transforming the confirmation data in a first structure of a randomly generated number into a second, hybrid data structure different from the first structure, the second, hybrid data structure comprising the randomly generated number and the pre-determined data identifying the online software application, wherein the second computer records the confirmation data in the second, hybrid data structure to the activity log and the first computer transmits the electronic message including the confirmation data in the second, hybrid data to the end user computer.

5. The computer-implemented method of claim 4, wherein the second, hybrid data structure comprises the randomly generated number and the pre-determined data appended to the randomly generated number, the pre-determined data being configured to identify the online software application.

6. The computer-implemented method of claim 1, wherein the electronic message comprises an electronic mail message, and wherein the account includes an electronic mail address of the end user, and the electronic mail message including the confirmation data is transmitted by the online software application to the electronic mail address.

7. The computer-implemented method of claim 6, wherein the electronic mail message is transmitted by the online software application to the end user computer through a separate electronic mail server.

8. The computer-implemented method of claim 1, wherein the electronic message comprises a text or SMS message, wherein the account includes a phone number of a mobile communication device of the end user, and wherein the text or SMS message including the confirmation data is transmitted by the online software application to the mobile communication device utilizing the phone number.

9. The computer-implemented method of claim 1, wherein the confirmation data is included in the electronic message and viewable by the end user when the electronic message is presented to the end user through a display of the end user computer.

10. The computer-implemented method of claim 1, wherein the electronic message is transmitted by the first computer to the end user computer after the first computer receives a confirmation from the second computer that the confirmation data has been recorded to the activity log.

11. The computer-implemented method of claim 1, wherein the electronic message data recorded to the activity log is a pre-determined portion of the electronic message generated by the first computer.

12. The computer-implemented method of claim 1, wherein the pre-determined portion comprises a subject line of the electronic message.

13. The computer-implemented method of claim 1, wherein the pre-determined portion comprises timestamp data of the electronic message.

14. The computer-implemented method of claim 1, after the electronic message is transmitted to the end user computer, further comprising the first computer:
 providing the end user computer access to the account in response to an entry of end user credentials through a network;
 receiving a request including the messaged data from the end user computer through the account to confirm that the electronic message was sent by the online software application and is not a fraudulent phishing electronic message,
 by accessing the activity log of the second computer through a network, determining whether the messaged data of electronic message received from the end user computer and the confirmation data previously recorded to the activity log match; and
 generating a response indicating whether the online software application is the source of the electronic message that is the subject of the received request, the response being provided to the end user computer in response to the end user computer request.

15. The computer-implemented method of claim 1, wherein the electronic message comprises a predetermined address of a website of a host of the online software application, wherein the end user computer accesses the website to enter the confirmation data and confirm that the source of the electronic message was the online software application and that the electronic message is not a fraudulent phishing electronic message.

16. The computer-implemented method of claim 15, wherein the website is hosted by the first computer.

17. The computer-implemented method of claim 15, wherein the website is hosted by a third computer in communication with the second computer through at least one network, and the website is accessed by the end user computer independently of the account the user has with the online software application.

18. The computer-implemented method of claim 17, after the electronic message is transmitted to the end user computer, further comprising the third computer:
 providing the end user computer access to the web site by execution of a browser by the end user computer;
 receiving a request initiated by the end user computer to confirm that the electronic message was sent by the online software application and is not a fraudulent phishing electronic message;
 by accessing the activity log of the second computer through a network, determining whether the messaged data received from the end user computer and the logged confirmation data previously recorded to the activity log match; and
 in response to the determining, generating a response indicating whether the online software application is the source of the electronic message, the response being provided to the end user computer in response to the end user computer request.

19. The computer-implemented method of claim 15, wherein the website is accessed through the account that the user has with the online software application.

20. The computer-implemented method of claim 1, after the electronic message is transmitted to the end user computer, further comprising a third computer in communication with the second computer receiving a call from a telephone device of the end user and a request to confirm that the electronic message was sent by the online software application and is not a fraudulent phishing electronic message, the request being made through an interactive menu presented to the end user through a phone device;

the third computer automatically accessing the activity log of the second computer through a network, generating a response indicating whether the online software application is the source of the electronic message that is the subject of the received request, the response being presented to the end user through the phone device.

21. The computer-implemented method of claim 1, after the electronic message is transmitted to the end user computer, further comprising a third computer in communication with the second computer receiving a call from a phone of the end user and a verbal request by the end user to confirm that the electronic message was sent by the online software application and is not a fraudulent phishing electronic message is made through an interactive menu presented to the end user through a phone device;

the third computer accessing the activity log of the second computer through a network, generating a response indicating whether the online software application is the source of the electronic message that is the subject of the received request, the response being presented to the end user through the phone device.

22. A computer-implemented method, comprising:

a first computer generating an electronic message, wherein the first computer hosts an online software application accessible by a computer of an end user over a first network that has an account associated with the online software application;

the first computer, by the online software application, generating confirmation data associated with the electronic message, the confirmation data having a hybrid data structure comprising a randomly generated number and a pre-determined data for identifying the online software application hosted on the first computer;

the first computer, by the online software application, transmitting electronic message data and the confirmation data through a second network to a second computer different from the first computer, the second computer hosting an activity log in which computer events involving the account of the end user are recorded; and the first computer transmitting the electronic message including the confirmation data through the first network to the end user computer to enable a confirmation that a source of the electronic message was the online software application and that the electronic message is not a fraudulent phishing electronic message.

23. A networked anti-phishing computing system, comprising:

a first computer hosing an online software application and being in communication with a computer of an end user having an account associated with the online software application through a first network; and a second computer hosting an activity log and being in communication with the first computer through at least one network;

the first computer being configured or programmed to generate an electronic message and confirmation data associated with the electronic message, the confirmation data having a hybrid data structure comprising a randomly generated number and a pre-determined data for identifying the online software application hosted on the first computer, transmit electronic message data and the confirmation data through a second network to a second computer different from the first computer, the second computer being configured to update an activity log associated with the end user's account to record the electronic message data and the confirmation data linked to the electronic message data associated with the online software application hosted on the first computer, and the first computer being further configured or programmed to transmit the electronic message including the confirmation data through the first network to the end user computer to enable a confirmation that a source of the electronic message was the online software application and that the electronic message is not a fraudulent phishing electronic message.

* * * * *